(12) United States Patent
Buttermore

(10) Patent No.: US 11,559,906 B1
(45) Date of Patent: Jan. 24, 2023

(54) APPARATUS AND METHOD FOR OBJECT MOUNTING SYSTEM

(71) Applicant: Neil Buttermore, Gunnison, CO (US)

(72) Inventor: Neil Buttermore, Gunnison, CO (US)

( * ) Notice: Subject to any disclaimer, the term of this patent is extended or adjusted under 35 U.S.C. 154(b) by 0 days.

(21) Appl. No.: 17/824,090

(22) Filed: May 25, 2022

(51) Int. Cl.
| | |
|---|---|
| B25J 15/06 | (2006.01) |
| B60R 9/04 | (2006.01) |
| F16B 47/00 | (2006.01) |
| B64D 1/02 | (2006.01) |
| B64C 39/02 | (2006.01) |
| B66C 1/02 | (2006.01) |

(52) U.S. Cl.
CPC ............ *B25J 15/0625* (2013.01); *B60R 9/04* (2013.01); *B64C 39/024* (2013.01); *B64D 1/02* (2013.01); *B66C 1/0256* (2013.01); *F16B 47/00* (2013.01); *B64C 2201/128* (2013.01)

(58) Field of Classification Search
CPC ............... B25J 15/0616; B25J 15/0625; B25J 15/0633; B60R 9/04; B60R 9/058; B60R 2011/0056; B64C 39/024; B64C 2201/128; B66C 1/0256; F16B 47/00
USPC ........................................................ 224/559
See application file for complete search history.

(56) References Cited

U.S. PATENT DOCUMENTS

| | | | | |
|---|---|---|---|---|
| 4,616,215 | A | | 10/1986 | Maddalena |
| 4,925,225 | A | * | 5/1990 | Dost ...................... B66C 1/0293 294/186 |
| 5,244,242 | A | * | 9/1993 | Goedecke .............. B65G 47/91 294/185 |
| 5,795,001 | A | * | 8/1998 | Burke .................. B65G 49/061 294/185 |
| 6,817,639 | B2 | * | 11/2004 | Schmalz ................ B65G 47/91 294/185 |
| 7,677,622 | B2 | | 3/2010 | Dunkmann |
| 9,091,612 | B2 | | 7/2015 | Lehmann |
| 9,527,605 | B1 | | 12/2016 | Getry |
| 9,573,684 | B2 | | 2/2017 | Kimchi |
| 9,581,148 | B1 | * | 2/2017 | Solomon ................. B66C 13/12 |
| 9,821,721 | B2 | | 11/2017 | Casagrande |

(Continued)

FOREIGN PATENT DOCUMENTS

| | | |
|---|---|---|
| CN | 104323657 | 2/2015 |
| CN | 104622187 | 5/2015 |

(Continued)

OTHER PUBLICATIONS

"Vacuum Controllers, Gauges, and Systems" by Cole-Parmer Instrument Company, LLC, Web page <https://www.coleparmer.com/c/vacuum-controllers-gauges-and-systems>, 4 pages, Mar. 8, 2022.

(Continued)

*Primary Examiner* — Dean J Kramer
(74) *Attorney, Agent, or Firm* — Mohr Intellectual Property Law Solutions, PC

(57) ABSTRACT

Embodiments of an active object mounting system secure an object of interest to a surface of a secured-to object using one or more vacuum mounting modules, wherein each vacuum mounting module comprises at least one vacuum pump controllably coupled to a microcontroller, a vacuum cup fluidly coupled to the at least one vacuum pump, and a transceiver that receives an instruction corresponding to one of a vacuum cup actuation signal or a vacuum cup release signal.

11 Claims, 6 Drawing Sheets

(56) References Cited

U.S. PATENT DOCUMENTS

| | | | |
|---|---|---|---|
| 10,267,453 | B2 | 4/2019 | Casagrande |
| 10,483,142 | B1 | 11/2019 | Tan |
| 10,514,024 | B1* | 12/2019 | Shoemaker, Jr. ..... B64C 39/024 |
| 10,723,276 | B2 | 7/2020 | Casagrande |
| 10,737,632 | B2 | 8/2020 | Casagrande |
| 2005/0119789 | A1 | 6/2005 | Seeman |
| 2009/0242719 | A1 | 10/2009 | Carnevali |
| 2013/0299667 | A1 | 11/2013 | Casagrande |
| 2015/0375401 | A1* | 12/2015 | Dunkmann ......... B25J 15/0061 |
| | | | 294/185 |
| 2016/0023762 | A1 | 1/2016 | Wang |
| 2017/0197719 | A1 | 7/2017 | Kwon |
| 2020/0198546 | A1* | 6/2020 | Casagrande ......... F16B 7/0413 |
| 2020/0247539 | A1* | 8/2020 | Shoemaker, Jr. ........ B64D 1/12 |
| 2020/0331406 | A1 | 10/2020 | Casagrande |

FOREIGN PATENT DOCUMENTS

| | | | | |
|---|---|---|---|---|
| CN | 105757110 A | * | 7/2016 | ............. F04B 49/06 |
| CN | 109552194 A | * | 4/2019 | ............. B60R 9/058 |
| CN | 114379465 A | * | 4/2022 | |
| KR | 20080054468 | | 6/2008 | |
| WO | 2014043261 | | 3/2014 | |
| WO | 2018227203 | | 12/2018 | |

OTHER PUBLICATIONS

"Freedom IQ Vacuum System" Information for Use pamphlet, Rev A, 2019, 20 pages, IFU-03-004, Freedom Innovations, LLC, Irving, CA.

"Precision Vacuum Monitor" by Lab Society, Weeb page <http://labsociety.com/lab-equipment/precision-vacuum-monitor/>, 8 pages, Mar. 8, 2022.

"Vacuum Pads for Uneven Surfaces" by McMaster-Carr, Web page <https://www.mcmaster.com/vacuum-cup-mounts/vacuum-pads-for-uneven-surfaces/>, 2 pages, Apr. 9, 2021.

"Static-Control Vacuum Pads for Uneven Surfaces" by McMaster-Carr, Web page <https://www.mcmaster.com/vacuum-cup-mounts/static-control-vacuum-pads-for-uneven-surfaces/>, 1 page, Apr. 9, 2021.

"Freedom Innovations Collection" by PROTEORUSA, Web page <https://www.proteorusa.com/freedominnovationscollection>, 3 pages, Mar. 8, 2022.

* cited by examiner

APPARATUS AND METHOD FOR OBJECT MOUNTING SYSTEM

BACKGROUND OF THE INVENTION

In various situations, it is desirable to releasably secure an object of interest, interchangeably referred to herein as a payload, to a secured-to object. The secured-to object may be stationary, non-stationary, or even another object.

For example, a cargo carrier is an example of a secured-to object. Cargo carriers, also known as roof boxes, ski boxes or racks, cargo boxes, rooftop boxes, car toppers, bike racks, surfboard racks, or the like, are portable storage containers or devices that can be secured to the top of an automobile or other vehicle on an as-needed basis. Such cargo carriers may be secured to structural elements, such as mounting brackets, roof racks, side rails, crossbars, or the like of the vehicle. These structural elements are typically integrated components that are permanently secured to the roof of the vehicle.

One problem encountered in the arts is that the roofs of the many different vehicle models vary significantly in shape, size and profile. Accordingly, some cargo carriers may only be suitable for a particular vehicle model. Universal cargo carriers are available, but their application may still be limited to a number of different vehicle models.

Many vehicles do not include permanently secured structural elements. Glass tops and/or glass sun roofs are becoming increasingly popular in the automotive industry. Further, there is a trend away from including permanently secured structural elements on new vehicles, especially sport cars. Accordingly, most commercially available cargo carriers are simply unsuitable for use in vehicles that do not have permanently secured structural elements.

In other situations, objects must be secured to a secured-to object in a releasable manner. For example, arial drones or the like (an exemplary secured-to object) have been designed to deliver and then release packages (an exemplary payload that is releasably secured to the arial drone). However, the releasable securing means employed by drones to deliver packages and other objects are, in themselves, very complex mechanical devices.

As another example, robotics technologies employ various types of robotic devices that are configured to releasably secure and then manipulate an object of interest. For example, a robotic arm (an exemplary secured-to object) may releasably secure and manipulate an object during a fabrication process. Consider an object that is manipulated into a particular location and/or orientation for a welding process that welds the releasably secured object to another object. Once the welding process has been completed, the robotic arm released the welded object. Here, the releasable securing means employed by robotic arm to releasably secure the welded object are, in themselves, very complex mechanical devices.

Another illustrative example occurs in the surveillance arts wherein an image capture device (camera) and/or microphone is secured to some secured-to object for some period of time, such as a few weeks or even several months or years. Non-limiting example of a secured-to object includes walls, building structures, vehicles, etc. Permanently securing a camera or other surveillance device to a secured-to structure may not be desirable because the device mounting structure may require damage, such as by bolt or screw holes, to the secured-to structure.

In applications where an object is releasably secured to another object, theft deterrent is highly desirable. Further, safety standards may be applicable wherein the likelihood of an inadvertent release of the secured object must be minimized in accordance with an applicable safety standard.

Accordingly, in the arts of releasably securing an object in a temporary or semi-permanent manner, there is a need in the arts for improved methods, apparatus, and systems for semi-permanently releasably securing objects while maintaining any required safety standards and/or deterring theft.

SUMMARY OF THE INVENTION

Embodiments of an active object mounting system secure an object of interest to a surface of a secured-to object using one or more vacuum mounting modules, wherein each vacuum mounting module comprises at least one vacuum pump controllably coupled to a microcontroller, a vacuum cup fluidly coupled to the at least one vacuum pump, and a transceiver that receives an instruction corresponding to one of a vacuum cup actuation signal or a vacuum cup release signal.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
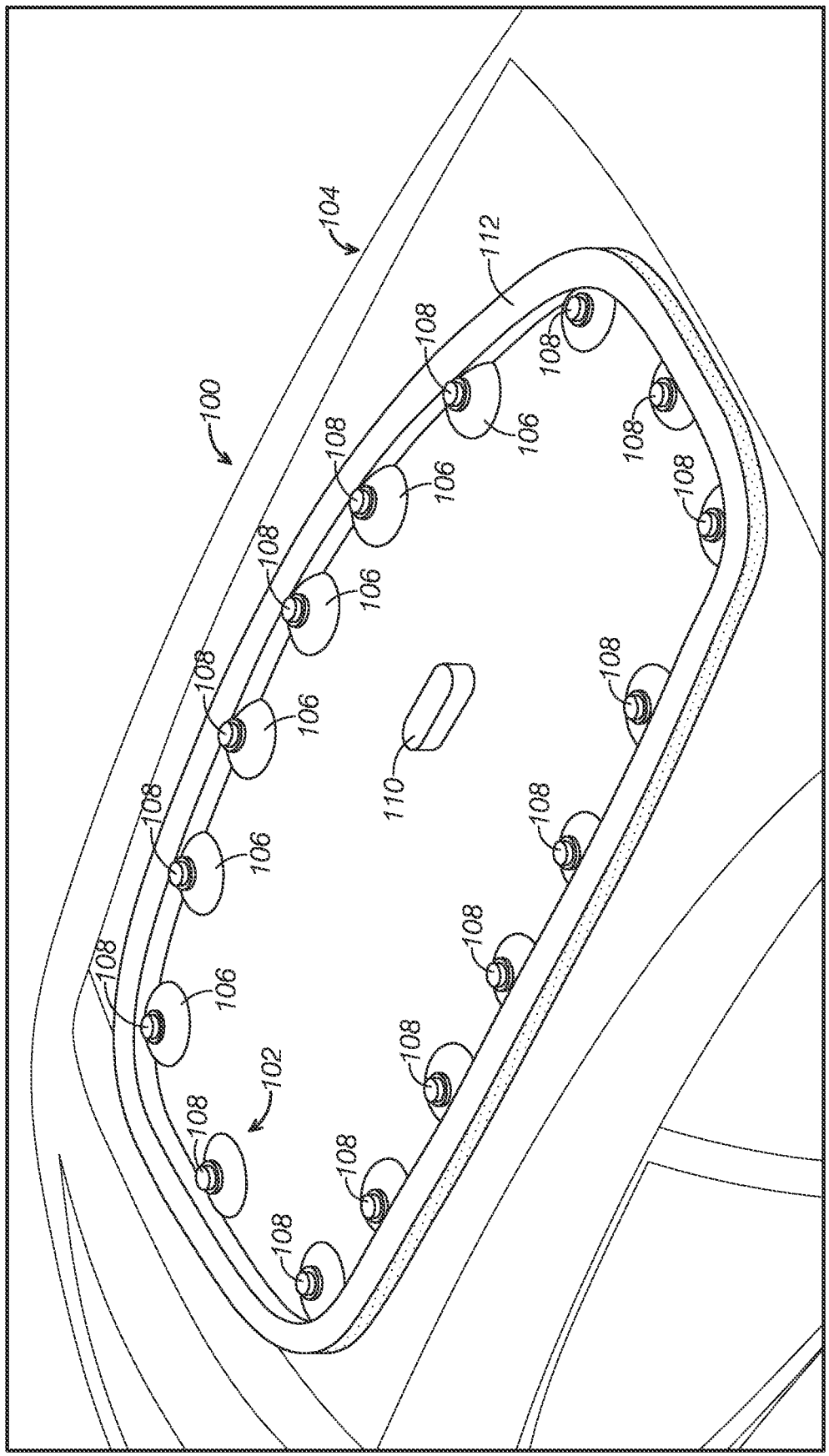
FIG. 1 is a top view of an active object mounting system configured to secure a cargo carrier (not shown) to the roof of a vehicle.

FIG. 1 is a top view of an active object mounting system 100 configured to secure a cargo carrier (not shown), preferably using a plurality of vacuum mounting modules 102. For example, the vacuum mounting modules 102 may secure an object, such as a cargo carrier, to the roof 104 of a vehicle.

Figure 4:
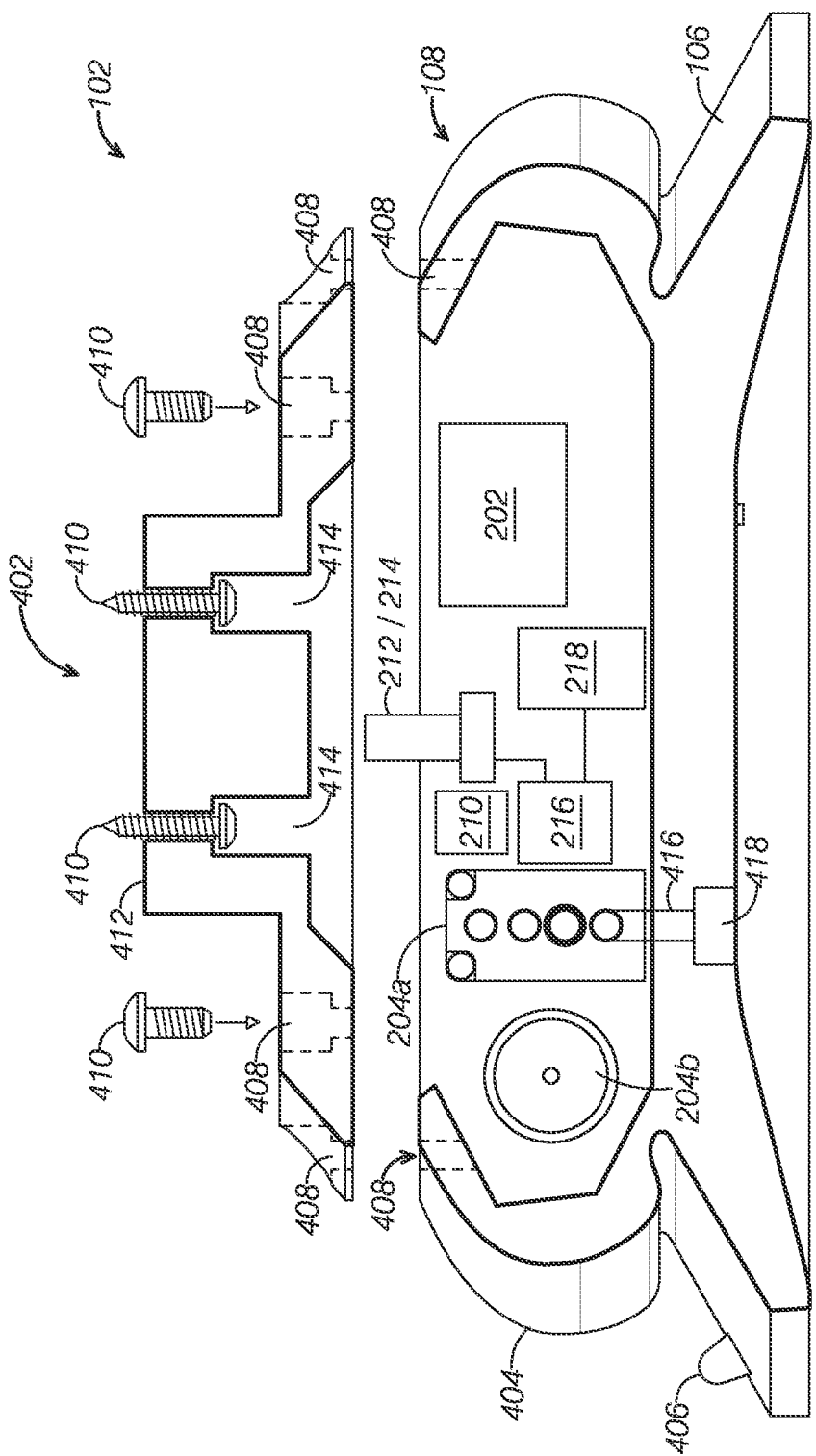
FIG. 4 is a side cut away view of the vacuum mounting module with a non-limiting example cover member.

Each vacuum mounting module 102 includes a vacuum cup 106 and a vacuum control unit 108. The vacuum cup 106 is disposed on an exterior of the body member on a side of the body member opposing the cover member 402 (FIG. 4). In the non-limiting illustrative example embodiment of FIG. 1, the active object mounting system 100 is coupled to a cargo carrier (not shown) using a suitable fastening means. Suitable fasteners may include snaps, buttons, straps, belts with buckles, hook and loop fasteners, zippers or the like. In other embodiments, the secured-to object and the vacuum mounting modules 102 of the active object mounting system 100 may be fabricated as a unibody integrated system.

The active object mounting system 100 may be used to releasably secure any object of interest to any secured-to object. For example, the secured-to object may be a package delivery aerial drone 302 (FIG. 3) and the object of interest may be a payload 304 that is delivered and released by the aerial drone 302 at a location of interest.

Figure 3:
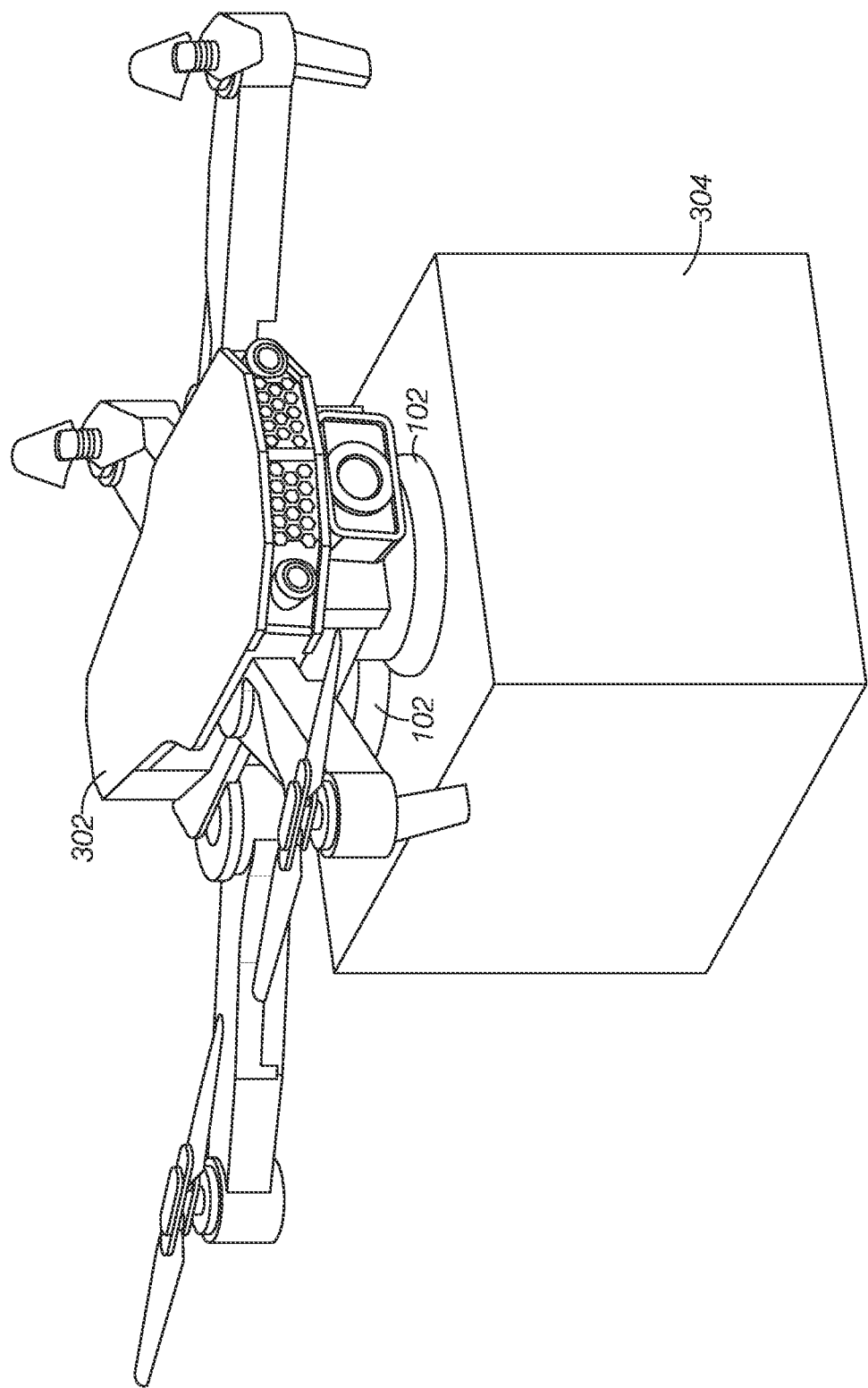
FIG. 3 is a perspective top view of a vacuum mounting module with its corresponding cover member secured to an aerial drone.

When a vacuum mounting module 102 is actuated in response to receiving a vacuum cup actuation signal from a vacuum control device 110, the vacuum control unit 108 operates a pump to create a vacuum having at least a predefined vacuum level (a negative atmospheric pressure) within the vacuum cup 106. The vacuum cup actuation signal may be generated by a variety of vacuum control devices 110 depending upon the particular embodiment of the active object mounting system 100 that is being used to releasably secure an object of interest, interchangeably referred to herein as a payload 304. Accordingly, a plurality of vacuum mounting modules 102 may be used to cooperatively secure a payload 304 in a releasable manner to a surface of a secured-to object (for example, the illustrated roof top 104 of a vehicle) or the example drone 302 (FIG. 3). Since each vacuum mounting module 102 independently maintains a target vacuum level or range within its respective vacuum cup 106, the payload 304 may be secured for any period of time of interest. That is, the microcontroller 216 actuates the vacuum pump to maintain the predefined vacuum pressure between the surface and the vacuum cup 106 in response to the sensed vacuum pressure becoming greater than a first predefined vacuum pressure or in response to the sensed vacuum pressure becoming less than a second predefined vacuum pressure. Accordingly, the object of interest or payload 304 may be semi-permanently secured to the surface of the secured-to object.

In the non-limiting example application illustrated in FIG. 1, when the user wishes to use the cargo carrier (not shown), the active object mounting system 100 may be semi-permanently or temporarily releasably secured to the vehicle roof 104. When the user is not using the cargo carrier, the active object mounting system 100 may be released from the vehicle roof 104 so that the active object mounting system 100 can be removed from the vehicle roof 104. The vacuum mounting modules 102 release (return the pressure level to at least atmospheric air pressure) in response to receiving a vacuum cup release signal from the vacuum control device 110. In a preferred embodiment, one of the plurality of vacuum mounting modules 102 is also the vacuum control device 110. In other embodiments, the vacuum control device 110 may be another electronic device.

The vacuum control device 110 may generate a vacuum cup actuation signal and/or the vacuum cup release signal in response to a signal received from another device, such as a hand held communication device (a smart phone or the like), a remote device that may be part of and/or in control of the secured-to object, another device that receives input instructions from a user (such as, but not limited to, a switch, a button or another suitable manual controller), and/or a manual controller.

An unexpected advantage provided by embodiments of the active object mounting system 100 is to improve safety in using vehicle cargo carriers or other releasably secured objects of interest since the suction force exerted by the suction cups 106 of each of the vacuum mounting modules 102 is controllable to at least a predefined value defined by safety considerations. Further, embodiments provide anti-theft protection since the suction force exerted by the vacuum mounting modules 102 provide a strong secure means for securing a payload to the secured-to object than legacy securing means. Additionally, the active object mounting system 100 may be tamper resistant and cannot be easily removed by a thief The disclosed systems and methods for securing a payload to a secured-to object using the active object mounting system 100 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for releasably securing a payload to a secured-to object using the active object mounting system 100 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components. "Secured to" means directly connected without intervening components.

"Communicatively coupled" means that an electronic device is communicatively connected to another electronic device, either wirelessly or with a wire based connector, whether directly or indirectly through a communication network. "Controllably coupled" means that an electronic device controls operation of another electronic device.

Figure 2:
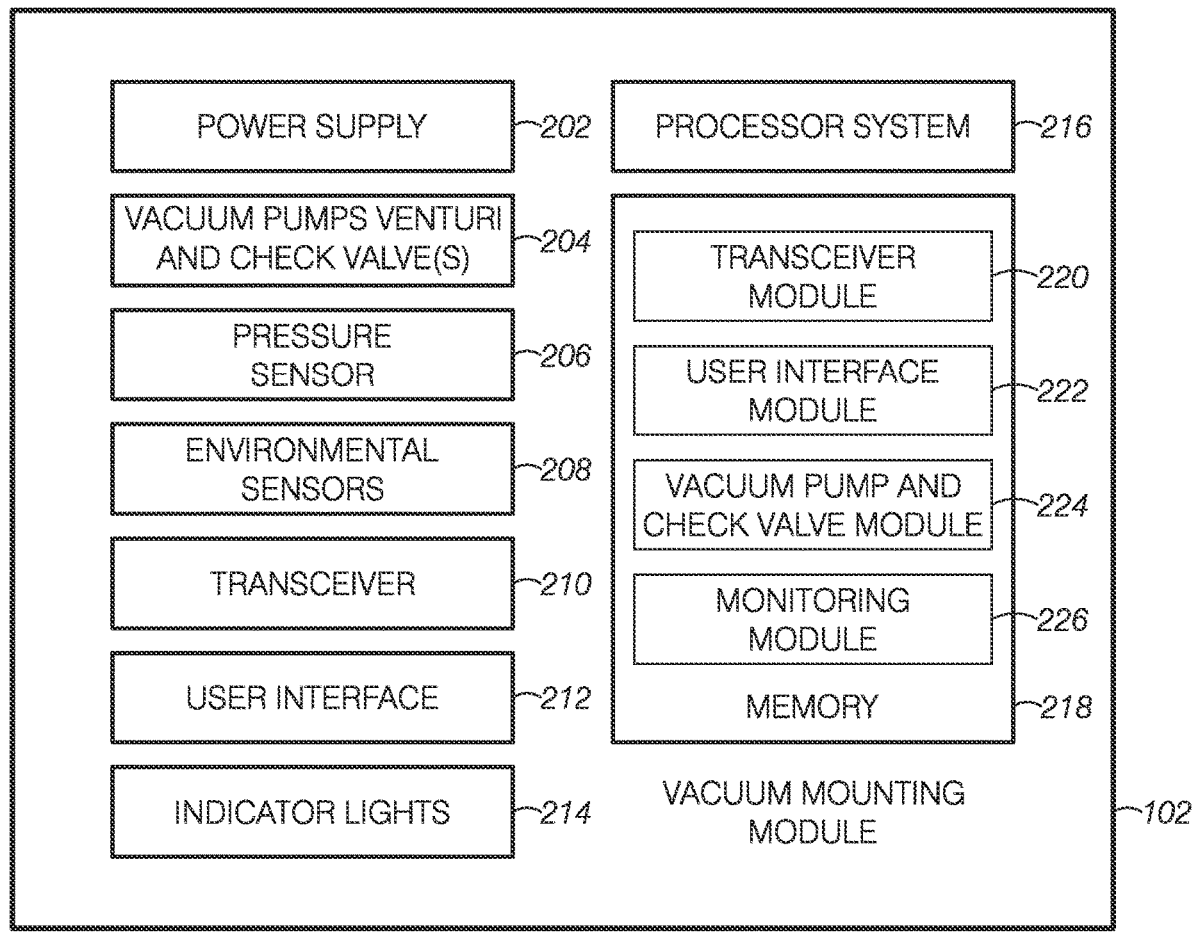
FIG. 2 is a block diagram of an embodiment of a vacuum mounting module showing example electronic components.

FIG. 2 is a block diagram of an embodiment of a vacuum mounting module 102 showing selected example electronic components. The non-limiting exemplary vacuum mounting module 102 comprises a power supply 202, a vacuum pump 204 (with an optional venturi), a pressure sensor 206, one or more optional environmental sensors 208, a transceiver 210, an optional user interface 212, optional indicator lights 214, a processor system 216, and a memory 218. The memory 218 comprises portions for storing the transceiver module 220, the user interface module 222, the vacuum pump and check valve module 224, and the monitoring module 226. In some embodiments, transceiver module 220, the user interface module 222, the vacuum pump and check valve module 224, and the monitoring module 226 may be integrated together, and/or may be integrated with other logic. In other embodiments, some or all of these memory and other data manipulation functions may be provided by using a remote server or other electronic devices suitably connected via the Internet or otherwise to a client device. Other embodiments of a vacuum mounting module 102 may include some, or may omit some, of the above-described components. Further, additional components not described herein may be included in alternative embodiments.

The power supply 202 is preferably a battery-based power supply that powers the processor system 216, the vacuum pump 204, and other selected components. Replaceable batteries and/or rechargeable batteries may be used. Preferably, the power available from the power supply is sufficient to operate the vacuum mounting module 102 for at least a predefined semi-permanent duration, which may be several weeks, several months, or even a year or more. Any suitable power source may be used in alternative embodiments, such as, but not limited to, a generator, solar power, magnetic power, etc.

In a preferred embodiment, the processor system 216 monitors the power that is currently available from the power supply 202. If the power decreases below a threshold, a warning notification may be communicated from the processor system 216 to the vacuum control device 110, to the user's portable hand held electronic device, and/or another system, such as the vehicle control system. In some embodiments, power management recommendation may be made to the user so that they can manage use of the vacuum mounting modules 102. For example, if the power is supplied by batteries and if a low battery condition occurs, or if a low battery condition can be projected to occur in the near future, the user may be notified of remaining power or battery life. Then the user may choose to replace one or more of the batteries of the power supply 202, and/or recharge the batteries if the batteries are rechargeable.

The vacuum pump 204, which is controllably coupled to the processor system 216, is an electric vacuum pump that establishes a vacuum (pressure that is less than the actual air pressure) that is sufficient to secure the vacuum cup 106 to a surface of the payload that is releasably secured. An optional venturi may be used with the vacuum pump 204. The pressure differential across the venturi, if used, enhances the efficiency of the vacuum pump 204. The processor system 216, executing the vacuum pump and check module valve 224, controls operation of the vacuum pump 204. In response to receiving a vacuum cup actuation signal, the vacuum pump 204 is operated to create the vacuum that releasably secures vacuum mounting module 102 to the payload. The processor system 216, in response to receiving a vacuum cup release signal, operates the vacuum pump 204 to release the vacuum to release the payload from the vacuum mounting module 102. Any suitable vacuum pumps 202 now known or later developed are intended to be included within the scope of this disclosure and to be protected by the accompanying claims.

A preferred embodiment has two or more vacuum pumps 204a, 204b. A port 416 fluidly couples the vacuum pumps 204a, 204b with the interior cavity of the vacuum cup 106. A check valve 418 (FIG. 4) may be used to maintain an established vacuum pressure within the interior of the vacuum cup 106. The check valve 418 has a cracking pressure corresponding to the predefined vacuum pressure in the vacuum chamber such that the predefined vacuum pressure is maintained within the vacuum cup 106 when the vacuum cup mounting system 100 is secured to the surface of the object of interest. The check valve 418 may be a mechanical check valve that uses a spring or the like to operate the valve, or may be an active check valve that uses electricity to operate the check valve 418. Control of an electronic check valve 418 would be managed by the processor system 216 (FIG. 2) executing the vacuum pump and check valve module 224.

Multiple vacuum pumps 204 provide reliability in the event of a single vacuum pump 204 failure. Any desired number of vacuum pumps 204 may be used in the various embodiments. Also, multiple vacuum pumps 204 can be used to cooperatively create a stronger vacuum.

An optional pressure sensor 206 monitors pressure within the vacuum cup 106. The pressure sensor 206 is communicatively coupled to the processor system 216 (interchangeably referred to herein as a microcontroller). The microcontroller 216, executing the monitoring module 226, monitors the sensed vacuum pressure within the vacuum cup 106 on a real time basis. Once a vacuum has been established to releasably secure the payload to the vacuum cup 106, the processor system 216, executing the vacuum pump and check valve module 224, may further operate the vacuum pump 204 in response to the monitored pressure within the vacuum cup 106 dropping below some predefined threshold. Accordingly, the vacuum pressure within each of the plurality of vacuum cups 106 can be controlled to any desired predetermined pressure value or range.

For example, the vacuum within the plurality of vacuum cups 106 will vary with elevation. In instances where the user drives the vehicle to a higher elevation, or to a lower elevation, the processor system 216 may operate the vacuum pump(s) 204 to adjust and/or maintain the vacuum pressure to the desired target pressure value or range as the elevation changes. For example, the sensor 206 may sense current vacuum pressure. The processor system 216 compares the current vacuum pressure to one of more predefined thresholds. Instructions are communicated to the vacuum pump(s) 204 to increase or decrease the vacuum pressure. Accordingly, a change in vacuum pressure is performed so that the current vacuum pressure remains as some predefined value (or range).

As another example, the vacuum pressure may be varied as a function of vehicle velocity. Here, a higher vacuum pressure may be generated at higher vehicle velocities to ensure that the vacuum mounting modules 102 do not become disengaged from a vehicle roof 104 due to the increasing wind created by the increased velocity of the vehicle. A velocity sensor (not shown), such as a speedometer, provides current vehicle speed information to the processor system 216. The processor system 216 compares the current vacuum pressure to predefined vacuum pressures associated with vehicle speed. Instructions are communicated to the vacuum pump(s) 204 to increase or decrease the vacuum pressure to a new vacuum pressure that corresponds to the current vehicle velocity. Accordingly, a change in vacuum pressure is performed so that the current vacuum pressure value (or range) is appropriate for the current velocity.

In an example embodiment, a pressure sensor 206 is located within the vacuum mounting module 102 to sense vacuum pressure. The pressure sensor 206 may be a separate component located within the interior of the vacuum cup 106 or at a vacuum port 416 (FIG. 4) of the vacuum pump(s)

204. Alternatively, or additionally, the pressure sensor 206 may be an integrated component of the vacuum pump 204.

In the various embodiments, a predefined vacuum pressure or pressure range may be maintained within the vacuum cup 106. For example, a slow leak between the edges of the vacuum cup 106 and the surface of the releasably secured payload 304 may result in a loss of vacuum pressure. The sensor 206 may sense current vacuum pressure that is decreasing due to the slow leak. The processor system 216 compares the current vacuum pressure to one of more predefined thresholds. Instructions are communicated to the vacuum pump(s) 204 to increase or decrease the vacuum pressure. Accordingly, a change in vacuum pressure is performed so that the current vacuum pressure remains as some predefined value (or range). Accordingly, the vacuum control unit 108 may automatically operate once the vacuum pressure has fallen outside of the predefined threshold or threshold range to re-establish the vacuum pressure. Some embodiments may employ electronic check valves 418 that may be actuated and/or adjusted to facilitate maintenance of a desired vacuum pressure.

As another example, changing environmental conditions, such as temperature and/or altitude, may be changing the vacuum pressure, thereby causing the control unit 108 to automatically operate in response to the vacuum pressure falling or increasing beyond a predefined threshold or threshold range to re-establish the vacuum pressure. Here, the sensor 206 may sense current vacuum pressure that is changing due to changing environmental conditions. The processor system 216 compares the current vacuum pressure to one of more predefined thresholds. Instructions are communicated to the vacuum pump(s) 204 to increase or decrease the vacuum pressure. Accordingly, a change in vacuum pressure is performed so that the current vacuum pressure remains as some predefined value (or range).

The environmental sensors 208 may be used to monitor external environmental conditions, such as humidity, rain, wind speed, ambient air pressure, temperature or the like. Based on sensed environmental conditions, the processor system 216, executing the vacuum pump and check valve module 224, may modify the predefined minimum vacuum pressure so that the vacuum pressure maintained within the vacuum cup 106 is suitable for changing environmental conditions. For example, if altitude increases such that the ambient air pressure decreases, or the altitude decreases such that ambient air pressure increases, then actual vacuum pressure may be automatically adjusted by the vacuum control unit 108 and/or the vacuum control device 110 to maintain a predefined minimum and/or maximum vacuum pressure within the vacuum cup 106 or the vacuum mounting modules 102. Alternatively, some embodiment may maintain a predefined pressure difference between the vacuum within the vacuum cup 106 and the current ambient air pressure.

The transceiver 210 is configured to wirelessly receive and/or transmit wireless radio frequency (RF) communication signals to other transceivers 210 residing in other vacuum mounting modules 102 and/or the vacuum control device 110. In such embodiments, the wireless communication transceiver 210 may be a low power communication system, such as a near-field communication system. An example near-field communication is Bluetooth. Any suitable low power and/or near-field communication system now known or later developed may be used in the various embodiments. A low power near-field communication system is suitable because of the close proximity of the vacuum mounting modules 102 and/or the vacuum control device 110 to each other.

Alternatively, or additionally, other wireless based communication networks and/or hybrid communication networks may be communicatively coupled to the transceiver 210. Example communication system include, but are not limited to, a cellular phone system, a Wi-Fi system, a satellite system, a radio frequency (RF) system, and/or a telephony system. In such embodiments, the transceiver 210 may be communicatively coupled to the wireless communication system. Accordingly, the transceiver 210 enables communication between a remote electronic device and the vacuum mounting modules 102 and/or the vacuum control device 110. In some applications, the transceiver 210 is communicatively coupled to the user's portable hand held electronic device, such as a smart phone, notebook, or the like. In such embodiments, the user may use their portable hand held electronic device and/or another control system to operate (initiate the vacuum cup actuation signal and/or the vacuum cup release signal) and/or monitor performance of the vacuum mounting modules 102 and/or the vacuum control device 110.

In an example embodiment, the processor system 216, executing the transceiver module 220, receives communications from and/or transmits communications to other vacuum mounting modules 102, the vacuum control device 110, or another remote electronic device. As disclosed herein, the vacuum mounting module 102 operates the vacuum pump 204 to establish a vacuum within the vacuum cup 106 in response to the transceiver 210 receiving the vacuum cup actuation signal from the vacuum control device 110, one of the other vacuum mounting modules 102, and/or another remote electronic device. Conversely, the processor system 216, executing the transceiver module 220, may deactivate the vacuum pump 204 to end the vacuum within the vacuum cup 106 in response to the transceiver 210 receiving a vacuum cup release signal from the vacuum control device 110, from one of the other vacuum mounting modules 102, and/or from another remote electronic device.

An optional user interface 212 may be provided to enable manual control of a vacuum mounting module 102 by a user. A button, switch or other controller may enable the user to manually actuate the vacuum control unit 108. The processor system 216, executing the user interface module 222, may operate the vacuum pump 204 to establish a vacuum within the vacuum cup 106 and/or to release the vacuum based on control signals generated by the user interface 212 in response to the user's manual manipulation of the user interface 212.

For example, the user may wish to relocate and/or reorient the secured payload after the payload has been initially secured to the secured-to object. For instance, location and/or orientation of a camera (the object of interest, or payload) that has been secured to a surface (the secured-to object) may be changed to adjust the field of view of images captured by the camera. The user may manually deactivate one or more of the vacuum mounting modules 102 to implement the adjustment, and then reactivate those vacuum mounting modules 102 to reestablish the vacuum within the vacuum cups 106.

One or more optional indicator lights 214 may be provided on the exterior of the vacuum mounting module 102 and/or the vacuum control device 110 to indicate operational status of the device and/or system. For example, the processor system 216 may cause the indicator light 214 to emit light when the vacuum mounting module 102 is functioning properly. Alternatively, or additionally, another colored light and/or another indicator light may emit light when the vacuum mounting module 102 is not properly working. Accordingly, the user may visually discern whether a vacuum mounting module 102 is properly operating based on the visible output of an indicator light 214. Is some embodiments, the indicator light 214 may be remotely located. Here, the indicator light 214 would be communicatively coupled to another remote transceiver. A light control signal, generated by the processor system 216, would be communicated from the transceiver 210 to the other transceiver. The light control signal would then be received by the remote indicator light 214.

Returning to FIG. 1, the active object mounting system 100 is generally described within the context of mounting a cargo carrier or other object to the roof top 104 of a vehicle. The active object mounting system 100 comprises a plurality of vacuum mounting modules 102 that releasably secure an object to a secured-to object, such as the example cargo carrier to the roof 104. Here, the secured-to object is the cargo carrier since the plurality of vacuum mounting modules 102 are secured to the cargo carrier before use. For clarity, the cargo carrier is not illustrated in FIG. 1. In practice, each of the plurality of vacuum mounting modules 102 are secured to the cargo carrier, or an intervening structure, using a suitable fastening means before the active object mounting system 100 is used. The roof top 104 of the vehicle, in this illustrative example, is the object of interest that is being secured to the secured-to object (the cargo carrier) using the plurality of vacuum mounting modules 102 under the control of the vacuum control device 110.

The vacuum control device 110 is preferably in close proximity to the vacuum mounting modules 102. The vacuum control device 110 may be located at any convenient location. For example, but not limited to, the vacuum control device 110 could be secured to the underside of the cargo carrier. Alternatively, the vacuum control device 110 could be secured to the roof top 104 of the vehicle, kept in the passenger compartment of the vehicle, kept with the user, or kept within the cargo carrier. In some embodiments, a selected one of the vacuum mounting modules 102 also functions as the vacuum control device 110.

In a non-limiting example embodiment configured to secure a cargo carrier to the roof top 104 of a vehicle, an optional outer seal 112 may be used to form a seal between a portion of a surface of the secured-to object, such as the example cargo carrier and the vehicle roof 104. The outer seal 112 is a suitable semi-rigid or flexible material that generally conforms to the shape and size of the outer perimeter the active object mounting system 100 and/or the cargo carrier. In a preferred embodiment, the outer seal 112 is made of neoprene, rubber, rubberized foam, or the like of a suitable thickness (height) that is sufficient to create a cavity between the lower surface of the cargo carrier 102 and the vehicle roof. Accordingly, the plurality of vacuum mounting modules 102 of an active object mounting system 100 fits between the lower surface of the secured-to object (such as a cargo carrier) 102 and releasably secured object of interest (here, the vehicle roof 104), and is surrounded by the outer seal 112.

In a non-limiting example embodiment, a suitable adhesive may be used to secure the outer seal 112 to the secured-to object and/or the releasably secured object. In other embodiments, the seal 112 may be secured using other means, such as hardware. In a preferred embodiment, the outer seal 112 forms a continuous ring of material surrounding the active object mounting system 100. In other embodiments, a non-continuous ring of material is used for the outer seal. Alternatively, or additionally, strips of material placed at selected locations may be used to form the outer seal 112.

In some embodiments, the outer seal 112 is not secured to either the secured-to object and the vehicle roof 104 or the releasably secured object. Rather, after the active object mounting system 100 is placed in position and is secured to the secured-to object, the outer seal 112 is placed around the vacuum mounting modules 102 of the active object mounting system 100. Then, the releasably secured object is placed in position over the outer seal 112.

In the various embodiments employing the optional outer seal 112, in response to actuation of the active object mounting system 100, air is drawn out from the plurality of vacuum mounting modules 102. The flexible vacuum cups 106 partially collapse, decreasing their height as the vacuum within the vacuum cups 106 is created. Since the secured-to object is secured to the active object mounting system 100, the downward collapse of the vacuum cups 106 pulls the surfaces of the releasably secured object and the secured-to object together. Accordingly, the outer seal 112 is compressed to form a frictional seal between the surfaces of the releasably secured object and the secured-to object. Since the vacuum cups 106 are within the cavity formed by the compressed outer seal 112, the vacuum cups 106 are protected from weather and/or forces created by moving air. That is, since the outer seal 112 is made of a flexible and air tight material such as neoprene or the like, the outer seal 112 serves to diffuse weather and moving air away from the vacuum cups 106 to avoid disturbance to the vacuum cups 106. By protecting the seal of the vacuum cups 106 to the vehicle roof, power requirements on the vacuum pumps 110 may be decreased. Further, reliability may be increased to the leading edge vacuum cups 106 that may otherwise experience the greatest "lift" during vehicle movement.

In a preferred embodiment, the outer seal 112 is initially provided as a sheet of material that the user may cut to a desired shape and size. Alternatively, or additionally, a pre-cut outer seal 112 may be provided that is cut based on the dimensions of the active object mounting system 100, the secured-to object, and/or the releasably secured object.

In practice, the user places the active object mounting system 100 onto the vehicle roof 104 and adjusts the location of the cargo carrier (the secured-to object) so that plurality of vacuum mounting modules 102 are located at desired locations on the vehicle roof 104 (wherein the vacuum mounting modules 102 have already been secured to the secured-to object, here the cargo carrier). Next, the user actuates the active object mounting system 100 to cause the vacuum control device 110 to communicate the vacuum cup actuation signal to the vacuum mounting modules 102 to operate a vacuum pumps within each one of the vacuum mounting modules 102 to create a vacuum. The created vacuum then draws air from the underside of each vacuum cup 106 to create a vacuum. The generated vacuum then seals the vacuum cup 106 of each of the vacuum mounting modules 102 to the top surface of the vehicle roof 104 so long as the vacuum is maintained. Accordingly, the cargo carrier is then secured to the vehicle roof Preferably, when the vehicle has a glass top, the plurality of vacuum cups 106 are located over the glass top. A relatively strong seal is created between each vacuum cup 106 (and the intervening outer seal) and the smooth glass surface of the vehicle's glass top. Alternatively, the plurality of vacuum mounting modules 102 may be secured to a painted surface of a metal vehicle roof. Further, the active object mounting system 100 can be used to secure other types of releasably secured objects to other surfaces of a vehicle, such as a vehicle trunk, side, or other surface.

It is appreciated that the optional outer seal 112 disposed between the secured-to object and the object of interest (payload), with one or more vacuum mounting modules 102 disposed within the outer seal 112, may be used depending upon the particular application of the invention. For example, a camera (here, the secured-to object, wherein one or more vacuum mounting modules 102 are secured to the camera) may be secured to a wall of a building or a surface of a vehicle (here, the secured-to object that the camera is releasably secured to) using the optional outer seal 112. Alternatively, the camera may be releasably secured to the wall of the building or the surface of a vehicle without the use of the outer seal 112.

FIG. 3 is a perspective top view of a vacuum mounting module 102 with its corresponding cover member 402 (FIG. 4) secured to an aerial drone 302. FIG. 4 is a side cut away view of the vacuum mounting module 102 with a non-limiting example cover member 402. The vacuum control unit 108 is preferably defined by a rigid or semi-rigid body member 404 (such as, but not limited to, a monocoque body) that defines a cavity that encases the various components within the vacuum control unit 108. Some embodiments may be formed as a monocoque body. The body member 404 protects the various components within the body cavity from damage. In a non-limiting example embodiment, the monocoque body member 404 defines a monocoque cavity that secures and protects the components of the vacuum control unit 108, and wherein the vacuum cup 106 is coupled to the monocoque body member 404.

The vacuum cup 106 is preferably made of a flexible or semiflexible material that is air impermeable. In the various embodiments, the vacuum cup 106 is permanently secured to the body member 404 in an air tight fashion. Or, the body member 404 and the vacuum cup 106 are formed as a unibody piece.

The example embodiment illustrated in FIG. 4 includes one or more optional manual disengagement tabs 406. The manual disengagement tab 406 is an outward protruding member on the outer side of the vacuum cup 106. The tab 406 can be grasped by the user to lift a bottom portion of the flexible vacuum cup 106 away from the surface of the payload after the vacuum has been released. When the user grasps and pulls on the manual disengagement tab 406, ambient air inrushes into the interior of the vacuum cup 106 so that any remaining vacuum pressure is released, thereby releasing the vacuum mounting module 102 from the payload. Any desired number of manual disengagement tabs 406 may be provided at any location of interest in the various embodiments.

A plurality of apertures 408 (holes) are illustrated as being fabricated into the body member 404 of the vacuum control unit 108. These apertures 408 are used to secure the cover member 402 to the upper surface of the body member 404. The apertures 408 may be threaded holes that matingly receive threaded bolts or screws 410 (FIG. 4) passing through corresponding apertures 408 in the cover member 402. When the bolts or screws 410 are screwed into place and then tightened, the cover member 402 becomes secured to the top of the body member 404. Alternatively, the apertures 408 may not be threaded such that a nut and bolt 410 may be used to secure the cover member 402 to the body member 404 of the vacuum control unit 108. Alternatively, or additionally, other fastening means such as threads, clamps, magnets, adhesive, or the like may be used to secure the cover member 402 to the top of the body member 404.

In some embodiments, the cover member 402 may be secured to, or made part of, the body member 404 of the vacuum control unit 108 during fabrication.

The non-limiting example cover member 402 includes an outwardly protruding member 412 that protrudes outwardly from an outer surface of the cover member 402. Optional apertures 414 may be disposed through the outwardly protruding member 412. Bolts or screws 410 are used to secure the cover member 402 to the secured-to object. The height of the outwardly protruding member 412, is this non-limiting example embodiment, is sufficiently high to permit access to the apertures 408 when the bolts or screws 410 are used to secure the cover member 402 to the top of the vacuum control unit 108.

An unexpected advantage provided by the cover member 402 is that outside surface of the cover member 402 may be permanently (or semi-permanently) secured to, or releasably secured to, the surface of the secured-to object prior to use of the vacuum mounting module 102. For example, the cover member 402 may be screwed onto, bolted onto, or glued onto a surface of a building or vehicle (the secured-to object). Then, the top of the vacuum control unit 108 and the cover member 402 are secured together so that the vacuum mounting module 102 becomes secured to the surface of the secured-to object.

Figure 5A:
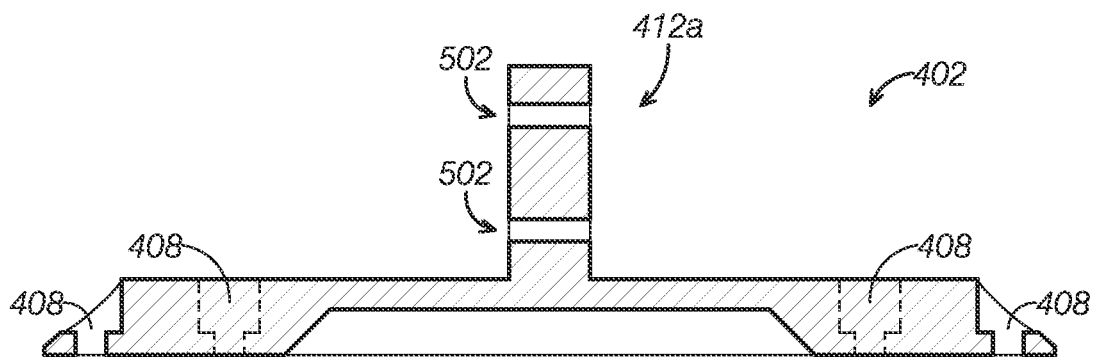
FIGS. 5A-5D illustrate various embodiments of the cover plate that are securable to the top of the body member of the vacuum control unit.

FIGS. 5A-5D illustrate various embodiments of the cover plate 402 that are securable to the top of the vacuum control unit 108 (FIG. 3 and FIG. 4). In FIG. 5A, one or more apertures 502 extend through the outwardly protruding member 412a. In this embodiment, bolts or screws 410 (FIG. 4) may be used to secure the cover member 402 to the secured-to object at any convenient time. That is, the secured-to object may be secured to the cover member 402 before or after the cover member 402 has been secured to the top of the vacuum control unit 108.

For instance, the secured-to object may be an image capture device (camera) or other mechanical device. The active object mounting system 100 may employ one or more vacuum mounting modules 102 secured to a surface of a vehicle (here, the object of interest). When the user wishes to acquire image information (still images and/or video), the user may easily secure the camera (here, the secured-to object) to the outwardly protruding member 412a, using bolts or screws 410 through the apertures 502. After use, the user may detach the camera for storage.

Figure 5B:
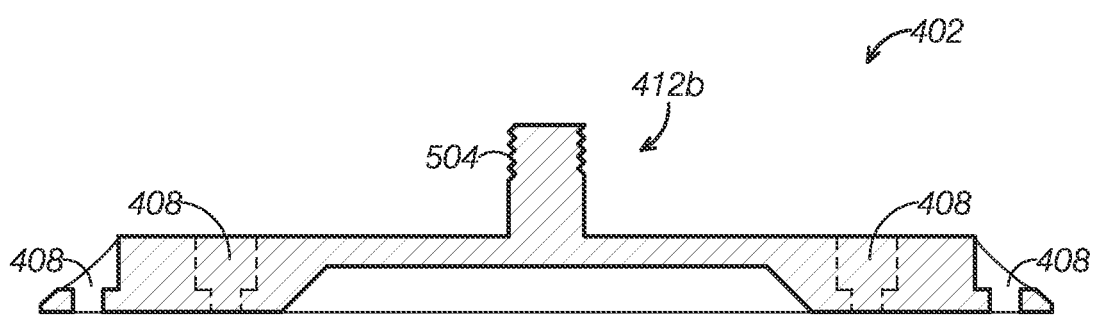

In FIG. 5B, threads 504 are disposed on the outside surface of the outwardly protruding member 412b. The above-described example camera or another object may have a threaded hole with threads that correspond to the threads 504. The camera or other object can be easily secured to and detached from the cover member 402 at any time.

Figure 5C:
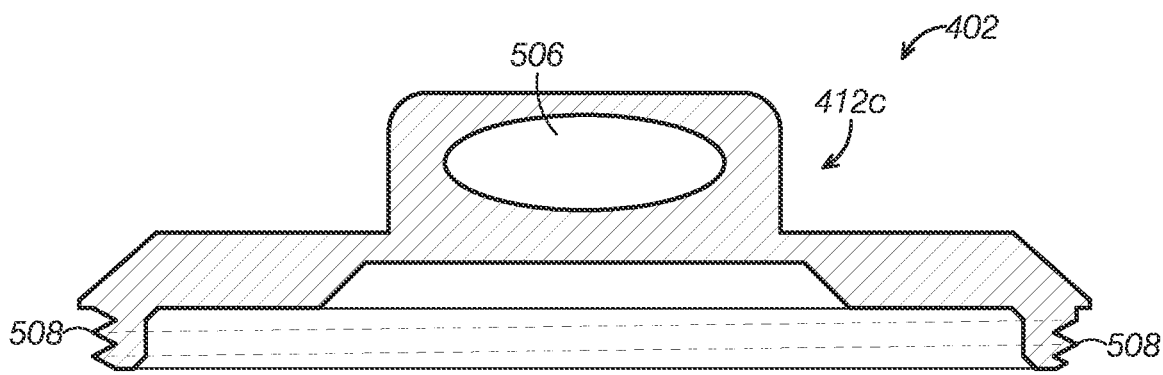

In FIG. 5C, a tie down aperture 506 extends through the outwardly protruding member 412c. A strap, rope, bungee cord, or other securing material may be passed through the tie down aperture 506 to secure any structure (here, the secured-to object) to the cover member 402 at any time. Alternatively, or additionally, a hook or the like secured to a strap, rope, bungee cord, or other securing material may be hooked to the tie down aperture at any time.

FIG. 5C illustrates another example securing means that may be used to secure a cover member 402 to the top of the vacuum control unit 108. Here, threads 508 are disposed along the outer edge of the cover member 402. Corresponding threads are disposed along the inside surface of the opening of the top of the vacuum control unit 108 (not shown). When the user wants to secure the cover member 402 to the top of the vacuum control unit 108, the user simply screws the cover member 402 onto the top of the vacuum control unit 108 (or vice versa) at any time.

Figure 5D:
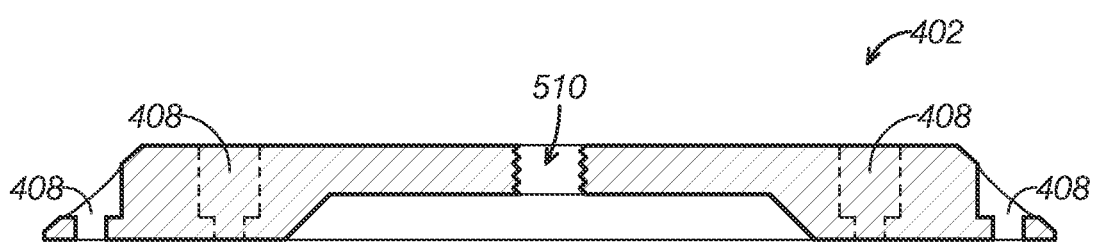

FIG. 5D illustrates an embodiment of the cover member 402 that does not have an outwardly protruding member 412. In this example embodiment, a threaded aperture 510 is disposed on the cover member 402. The threaded aperture 510 may pass through the cover member 402 or may extend downward through a portion of the cover member 402. After the cover member 402 has been secured to the top of the vacuum control unit 108, then the secured-to object having a corresponding outwardly protruding threaded member may be screwed onto the cover member 402.

After contemplating the disclosure, one skilled in the art appreciates that various types of securing means may be used to secure the cover member 402 to the top of the vacuum control unit 108 without departing from the novel features of the present invention. Similarly, one skilled in the art appreciates that various types of securing means may be used to secure the cover member 402 to any type of secured-to object without departing from the novel features of the present invention. All such embodiments are intended to be within the scope of this disclosure and to be protected by the accompanying claims.

Figure 6:
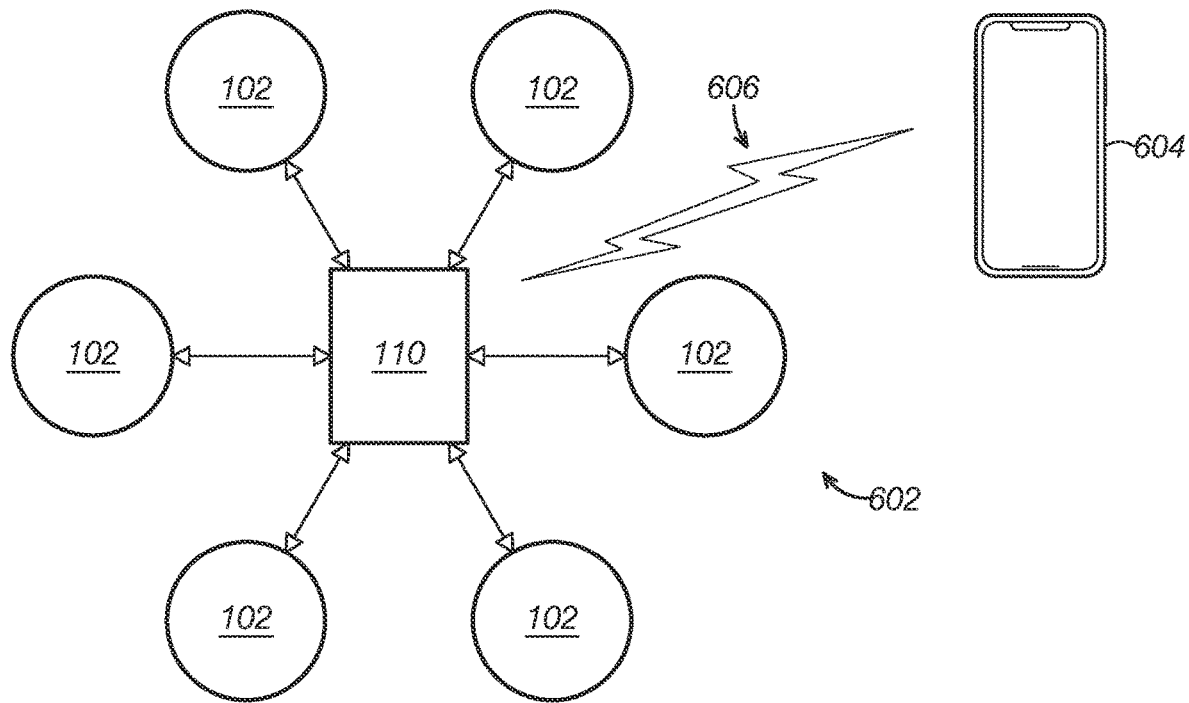
FIG. 6 is a block diagram of a vacuum mounting module control system employing a designated vacuum control device that controls a plurality of vacuum mounting modules.

FIG. 6 is a block diagram of a vacuum mounting module control system 602 employing a designated vacuum control device 110 that controls a plurality of vacuum mounting modules 102. Each of the vacuum mounting modules 102 (slave device) are controllably coupled to the vacuum control device 110 (master device). Preferably, a master/slave control system enables the vacuum control device 110 to generate and transmit vacuum cup actuation signals and vacuum cup release signals to the plurality of vacuum mounting modules 102 using a suitable near field or wire based communication signal. In some embodiments, a selected one of the vacuum mounting modules 102 is designated as the vacuum control device 110.

Also, the vacuum control device 110 is configured to receive information from the plurality of vacuum mounting modules 102. Operational status information may be communicated to the vacuum control device 110. For example, if one of the vacuum mounting modules 102 fails or begins to lose vacuum pressure, the vacuum control unit 108 can be notified of the failure and/or loss of vacuum pressure by that particular vacuum mounting module 102. Optionally, the vacuum control device 110 may increase vacuum pressure within the remaining vacuum mounting modules 102 to compensate for the failing vacuum mounting module 102. As another non-limiting example, vacuum pressure in one or more of the vacuum mounting modules 102 may be selectively modified by the vacuum control device 110.

Optionally, the vacuum control device 110 may be communicatively coupled to a remote electronic device 604. The remote electronic device 604 may communicate with the vacuum control device 110 using a suitable wireless communication signal 606 format, such as a near-field communication signal and/or a cellular communication signal. The vacuum control device 110 can generate and transmit the vacuum cup actuation signals and the vacuum cup release signals in response to receiving instructions from the remote electronic device 604. In some embodiments, a wire-based communication format may be used. Additionally, or alternatively, the vacuum control device 110 may communicate operational status information and/or vacuum pressure information to the remote electronic device 604. Accordingly, the user may appreciate the operating condition of the active object mounting system 100. If the remote electronic device 604 is a smart phone or the like, an app may be installed on the smart phone that facilitates communications between the smart phone and the vacuum control device 110.

Figure 7:
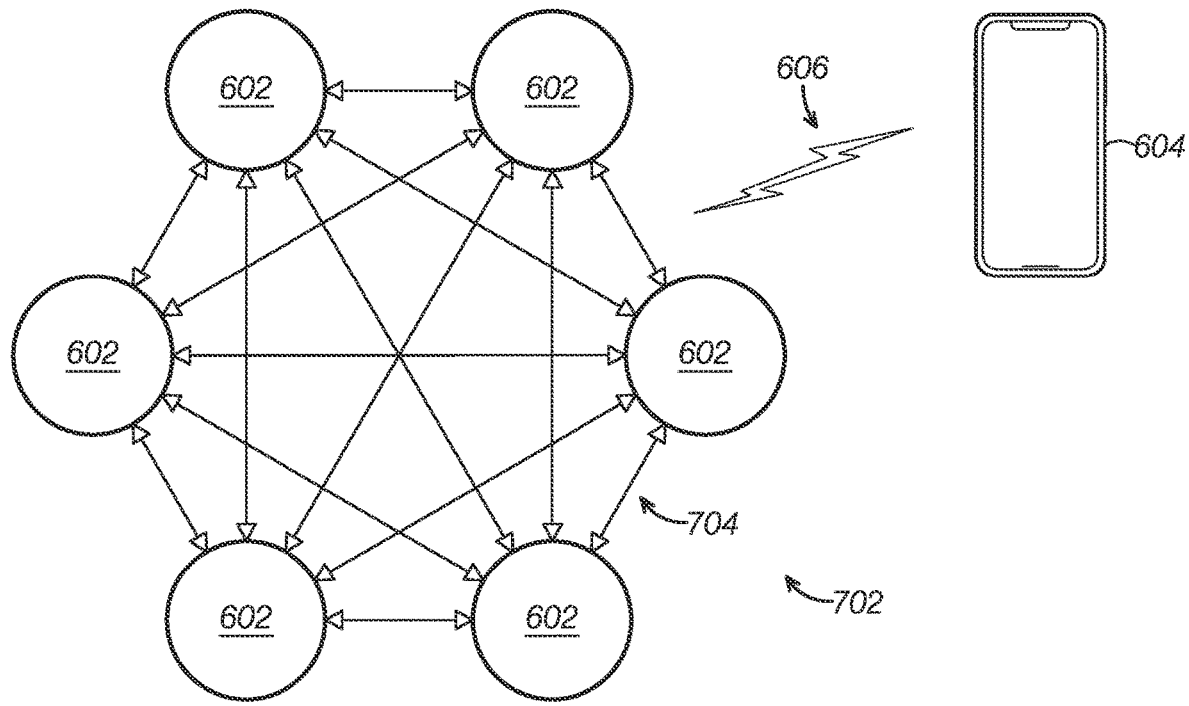
FIG. 7 is a block diagram of a vacuum mounting module control system employing mesh network wherein a plurality of vacuum mounting modules cooperatively control operation of the active object mounting system.

FIG. 7 is a block diagram of a vacuum mounting module control system 702 employing mesh network 704 wherein a plurality of vacuum mounting modules 102 cooperatively control operation of the active object mounting system 100. Here, individual vacuum mounting modules 102 are communicatively coupled together. Each of the vacuum mounting modules 102 communicate information to each of the other vacuum mounting modules 102, such as operational status and/or vacuum pressure. Accordingly, the vacuum mounting modules 102 cooperatively work together to secure an object of interest. Some embodiments may employ an artificial intelligence algorithm to more effectively control operation of the active object mounting system 100.

Optionally, one or more of the vacuum mounting modules 102 may be communicatively coupled to a remote electronic device 604 using a suitable wireless communication signal 606 format, such as a near-field communication signal and/or a cellular communication signal. When one or more of the vacuum mounting modules 102 receives instructions from the remote electronic device 604, the receiving vacuum mounting module 102 may communicate the vacuum cup actuation signal or the vacuum cup release signal to the other vacuum mounting modules 102. In some embodiments, a wire-based communication format may be used. Additionally, or alternatively, the one or more of the vacuum mounting modules 102 may communicate operational status information and/or vacuum pressure information to the remote electronic device 604. Accordingly, the user may appreciate the operating condition of the active object mounting system 100. If the remote electronic device 604 is a smart phone or the like, an app may be installed on the smart phone that facilitates communications between the smart phone and the vacuum control device 110.

After contemplation of this disclosure, one skilled in the art appreciates that the vacuum mounting modules 102 may be implemented using any suitable Internet of Things (IOT) technology. All such IOT embodiments, now known or later developed, are intended to be within the scope of this disclosure and to be protected by the accompanying claims.

It should be emphasized that the above-described embodiments of the active object mounting system 100 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions.

Therefore, having thus described the invention, at least the following is claimed:

1. A vacuum object mounting system, comprising;
an outer seal securable to a surface of an object of interest, wherein the outer seal corresponds to a shape and size of a selected portion of a surface of a secured-to object; and
a plurality of vacuum cup units each configured to secure a corresponding vacuum cup to the surface of the object of interest,
wherein each of the plurality of vacuum cup units comprise:
a cover member with an outer surface that is securable to the secured-to object;
a monocoque body member defined by a monocoque cavity that is covered by the cover member during use of the vacuum object mounting system;
the vacuum cup coupled to the monocoque body member, wherein the vacuum cup is disposed on an opposing side of the monocoque cavity;
a microcontroller residing within the monocoque cavity of the monocoque body member;
a vacuum pump residing within the monocoque cavity of the monocoque body member, wherein the vacuum pump is controllably coupled to the microcontroller, and wherein the vacuum pump is fluidly coupled to the vacuum cup; and
a power source controllably coupled to the microcontroller and connected to the vacuum pump,
wherein the power source powers the vacuum pump in response to an actuation signal received at the microcontroller to cause the vacuum pump to create a predefined vacuum pressure between the surface of the object of interest and the vacuum cup.

2. The vacuum object mounting system of claim 1, further comprising:
a transceiver communicatively coupled to the microcontroller,
wherein each one of the microcontrollers of the plurality of vacuum cup units is in communication with a vacuum control device, and
wherein each of the vacuum pumps of the plurality of vacuum cup units operate to create the vacuum between the surface of the object of interest and the vacuum cup in response to their respective microcontroller receiving the actuation signal from the vacuum control device via the respective transceiver.

3. The vacuum object mounting system of claim 2, further comprising:
at least one environmental sensor communicatively coupled to the transceiver and that senses an environmental condition,
wherein the at least one environmental sensor communicates environmental information corresponding to the sensed environmental condition to the transceiver,
wherein the received environmental information is communicated from the transceiver to the vacuum control device, and
wherein the vacuum control device determines an adjustment to the predefined vacuum pressure based on the received environmental information.

4. The vacuum object mounting system of claim 3,
wherein the corresponding microcontroller communicates adjustment information corresponding to the adjustment to the predefined vacuum pressure to the corresponding transceiver,
wherein the corresponding transceiver broadcasts the adjustment information,
wherein the transceivers in the other plurality of vacuum cup units receive the broadcasted adjustment information, and
wherein the corresponding microcontrollers effect the adjustment to their predefined vacuum pressure based on the received adjustment information.

5. The vacuum object mounting system of claim 1, wherein the cover member comprises:
an attachment means configured to attach the outside surface of the cover member to a surface of the secured-to object.

6. The vacuum object mounting system of claim 1, further comprising:
a vacuum chamber in fluid communication with the vacuum pump and the vacuum cup; and
a check valve disposed between the vacuum chamber and the vacuum cup,
wherein the microcontroller actuates the vacuum pump to maintain the predefined vacuum pressure in the vacuum chamber, and
check valve has a cracking pressure corresponding to the predefined vacuum pressure in the vacuum chamber such that the predefined vacuum pressure is maintained within the vacuum cup when the vacuum object mounting system is secured to the surface of the object of interest.

7. The vacuum object mounting system of claim 1, further comprising:
a pressure sensor communicatively coupled to the microcontroller,
wherein the pressure sensor senses actual pressure within the vacuum cup,
wherein the pressure sensor communicates pressure sensor information to the microcontroller corresponding to the sensed actual pressure, and
wherein the microcontroller actuates the vacuum pump to maintain the predefined vacuum pressure between the surface of the object of interest and the vacuum cup in response to the sensed vacuum pressure becoming greater than a first predefined vacuum pressure or in response to the sensed vacuum pressure becoming less than a second predefined vacuum pressure.

8. The vacuum object mounting system of claim 1, further comprising:
a manual actuator disposed on an outer surface of the vacuum cup unit and communicatively coupled to the microcontroller,
wherein a user actuates the manual actuator to release the vacuum cup unit from the surface of a secured-to object,
wherein the manual actuator communicates a release signal to the microcontroller in response to actuation by the user, and wherein the microcontroller actuates the vacuum pump to release the vacuum cup unit from the surface of the object of interest in response to receiving the release signal.

9. The vacuum object mounting system of claim 1, further comprising:
   a manual actuator disposed on an outer surface of the vacuum cup unit and communicatively coupled to the microcontroller,
   wherein a user actuates the manual actuator to secure the vacuum cup unit to the surface of the object of interest,
   wherein the manual actuator communicates a securing signal to the microcontroller in response to actuation by the user, and
   wherein the microcontroller actuates the vacuum pump to secure the vacuum cup unit to the surface of the object of interest in response to receiving the securing signal.

10. The vacuum object mounting system of claim 1, further comprising:
    an indicator light disposed on an outer surface of the vacuum cup unit and communicatively coupled to the microcontroller,
    wherein the manual actuator communicates a release signal to the microcontroller in response to actuation by the user, and
    wherein a user may view the indicator light to intuitively understand whether the vacuum cup unit is secured to the surface of the object of interest.

11. The vacuum object mounting system of claim 1, wherein the surface of the object of interest is an exterior surface of a vehicle.

* * * * *